United States Patent
O'Dell

(10) Patent No.: US 6,567,041 B1
(45) Date of Patent: May 20, 2003

(54) NETWORK SYSTEM AND METHOD FOR A REMOTE REFERENCE RECEIVER SYSTEM

(75) Inventor: Kent O'Dell, Atlanta, GA (US)

(73) Assignee: Sprint Spectrum, L.P., Overland Park, KS (US)

( * ) Notice: Subject to any disclaimer, the term of this patent is extended or adjusted under 35 U.S.C. 154(b) by 0 days.

(21) Appl. No.: 09/837,402

(22) Filed: Apr. 18, 2001

(51) Int. Cl.[7] ............................................. H04B 7/185
(52) U.S. Cl. ................................................ 342/357.03
(58) Field of Search ..................... 342/357.03; 701/215

(56) References Cited

U.S. PATENT DOCUMENTS

| | | | |
|---|---|---|---|
| 4,577,060 A | * | 3/1986 | Webb et al. ............... 340/7.27 |
| 4,751,512 A | | 6/1988 | Longaker |
| 5,323,322 A | | 6/1994 | Mueller et al. |
| 5,420,592 A | | 5/1995 | Johnson |
| 5,596,328 A | * | 1/1997 | Stangeland ............ 342/357.03 |
| 5,621,646 A | | 4/1997 | Enge et al. |
| 5,764,184 A | | 6/1998 | Hatch et al. |
| 5,774,831 A | | 6/1998 | Gupta |
| 5,828,336 A | | 10/1998 | Yunck et al. |
| 5,841,396 A | | 11/1998 | Krasner |
| 5,913,170 A | * | 6/1999 | Wortham ............... 342/357.08 |
| 5,928,306 A | * | 7/1999 | France et al. ............. 701/207 |
| 5,929,807 A | | 7/1999 | Viney et al. |
| 5,936,573 A | | 8/1999 | Smith |
| 5,973,639 A | | 10/1999 | Biacs et al. |
| 5,995,043 A | | 11/1999 | Murphy |
| 6,002,363 A | | 12/1999 | Krasner |
| 6,049,304 A | | 4/2000 | Rudel et al. |
| 6,052,647 A | | 4/2000 | Parkinson et al. |
| 6,064,336 A | | 5/2000 | Krasner |
| 6,067,484 A | | 5/2000 | Rowson et al. |
| 6,087,983 A | | 7/2000 | Ho et al. |
| 6,101,178 A | | 8/2000 | Beal |
| 6,144,335 A | | 11/2000 | Rogers et al. |
| 6,229,478 B1 | * | 5/2001 | Biacs et al. ............. 342/357.03 |
| 6,324,473 B1 | * | 11/2001 | Eschenbach ................ 701/215 |
| 6,380,888 B1 | * | 4/2002 | Kucik ................... 342/357.03 |

FOREIGN PATENT DOCUMENTS

JP        09311177 A    * 12/1997    ............. G01S/5/14

OTHER PUBLICATIONS

Data & Telecommunications Dictionary, J.K. Peterson, CRC Press, p. 507–508, 1999.*
Telecommunications: Glossary of Telecommunication Terms, Federal Standard 1037C, p. N–4, Aug. 7, 1996.*
Gene W. Hall LCDR USCG DGPS Operations Officer, "USCG Differential GPS Navigation Service", 7 pages.

(List continued on next page.)

Primary Examiner—Thomas H. Tarcza
Assistant Examiner—Fred H Mull
(74) Attorney, Agent, or Firm—Harley R. Ball; Steven J. Funk; Kevin D. Robb

(57) ABSTRACT

A position determining system using a first communication network, a second communication network, and a positioning system. The system may include at least one reference station that has known position coordinates and that is operable to receive first position signals from the positioning system. The reference station further may transmit position data via the first communication network in response to the first position signals and the known position coordinates. A remote central host communicatively coupled to the reference station via the first communication network can receive and store the position data transmitted from the reference station and generate and transmit correction data via the first or second communication network to provide either real-time or archived position corrections to a rover. The rover can receive its own positioning signals and, using the correction data and the position signals, can accurately determine its position.

28 Claims, 3 Drawing Sheets

OTHER PUBLICATIONS

William A. Stone New Mexico State Geodetic Advisor, National Geodetic Survey Albuquerque, New Mexico, USA, www.ngs.noaa.gov/PUBS_LIB/GPS_CORS.html, "An Overview of Global Positioning System Continously Operating Reference Stations", 12 pages.

Peter H. Dana, www.colorado.edu/geography/gcraft/notes/gps/gps.html, "Global Positing System Overview", pp. 1–14.

www.ca–surveyors.org/Articles/realtime.htm, 1 page.

Leica Geosystems, www.leica–geosystems.com/gps/product/sr520.htm, "Surveying systems, Leica Sr520 receiver", pp. 1–2.

Leica Geosystems, www.leica–geosystems.com/news/1999/gs50.htm, "1999 Leica Geosystems introduces new integrated GPS/GIS data collection system", Dated Mar. 6, 2001, pp. 1–2.

Leica Geosystems, www.leica–geosystems.com/gps/product/rs500.htm, "GPS Networks, Leica RS500 Advanced CORS", Dated Mar. 6, 2001, 3 pages.

Leica Geosystems, www.leica–geosystems.com/news/1999/pr–02–03–99.htm, "1999, Leica Installs DGPS Reference Station in New Jersey", Dated Mar. 6, 2001, 2 pages.

Leica Geosystems, www.leica–geosystems.com/news/2000/rs500.htm, "2000, Leica Geosystems introduces new turnkey DGPS Reference Station package", Dated Mar. 6, 2001, 2 pages.

Leica Geosystems, www.leica–geosystems.com/surveying/product/pr_by_ac.htm, "Product by application and accuracy", Dated Mar. 6, 2001, 5 pages.

Global Positioning Systems, Flatirons Surveying, Inc., Boulder, Colorado, www.flatsury.com/gps.htm, "Global Positioning Systems", Dated Mar. 14, 2001, 2 pages.

Ashtech Precision Products, www.ashtech.com/Pages/gpsndex.html, Technology, Dated Mar. 14, 2001, 17 pages.

AshtechSolutions, www.ashtech.com/Pages/surveyprod.html, "Products Surveying System", Dated Mar. 14, 2001, pp. 1–12.

Spatial News Press Release, spatialnews.geocomm.com/dailynews/2001/jan/23/news8.html, "Snap Track Awarded Patent for Locating or Tracking Wireless Devices Via Internet and Client–Server–Based Computer Networks", Dated Nov. 28, 2001, pp. 1—4.

Trimble, www.trimble.com/gps/nfsections/howworks/moreinfo3/aa_m3m.htm., "Trimble How GPS Works—Dual Frequency Measurements", Dated Mar. 12, 2001, 1 page.

www.trimble.com/gps/diffgps/page7.htm, "Trimble—Differential GPS", Dated Feb. 15, 2001, 1 page.

www.state.nj.us/dep/gis/resource/ch52.thm; Resource guide, "A Tutorial Into the World of Global Positioning Systems (GPS)", Dated Mar. 12, 2001, pp. 1–8.

Trimble, www.trimble.com/gps/nfsections/diffGPS/aa_dg5.htm, "Differential GPS, Other ways to work with Differential GPS", Dated Mar. 12, 2001, pp. 1–3.

Trimble, www.trimble.com/gps/nfsections/diffGPS/aa_gls.htm, "GPS Glossary, The Ideas Behind the Jargon", Dated Mar. 12, 2001, pp. 1–7.

Red Horse Technologies GPS Definitions and FAQ, www.redhorsetech.com/aggps/definitions.html, "Agricultural GPS Systems Red Horse Technologies, Understanding The GPS Terminology Used By Most Manufactures And Retailers", Dated Mar. 12, 2001, pp. 1–9.

www.uscg.mil/hq/rtc/atonblt/win99/posit/dgpsppt/dgps/ slides 3, 7, 9, 10, 13, 14, 17, 19, and 22, Dated Mar. 9, 2001, 9 pages.

Ian Mitchell, www.cs.ukc.ac.uk/research/infosys/mobicomp/Fieldwork/Conference97/mitchell.html, "The Global Positioning System: The Technology and it's potential, Conference: Mobile Computing in the Field," Dated Mar. 14, 2001, pp. 1–2.

Ashtech Precision Products: "2–Xtreme, Powered by Instant–RTK™ Technology" Product Brochure, 2000, 2 pages.

* cited by examiner

NETWORK SYSTEM AND METHOD FOR A REMOTE REFERENCE RECEIVER SYSTEM

BACKGROUND OF THE INVENTION

1. Field of the Invention

This invention relates generally to the global positioning system (GPS) and specifically to methods and devices that allow a user to reduce GPS positioning errors.

2. Description of Related Art

The global positioning system (GPS) is a United States funded satellite system consisting of sixteen to twenty-four satellites in a constellation that beams highly accurate, timed signals to earth. GPS receivers can process these signals from anywhere in the world and provide a user with position information that can generally be accurate to within 20 or 30 meters. Each GPS satellite moves through a known orbit, and the time that individual GPS satellite transmissions take to reach a user's position are used in solving a triangulation problem. The individual signal paths from each satellite to the user's position must pass through the troposphere and ionosphere. GPS errors can occur when radio signal propagation delays caused by the troposphere and ionosphere are not accurately accounted for. The ionosphere introduces its maximum delays at about 2:00 P.M. local time and has practically no effect at night. Thus, the local time may be important to GPS accuracy. The troposphere can introduce delays that are a function of barometric pressure, temperature, humidity and other weather variables. Variations in the actual orbit of each GPS satellite can also have an impact on GPS accuracy. Drifts in the clock of each GPS satellite will also impact user GPS accuracy.

GPS signals to positioning receivers that are close to each other on the earth's surface are subjected to nearly identical signal propagation delays, satellite clock drift, and other sources of error. Because of this, if the position of one receiver (i.e., a reference receiver) is accurately known, it can provide data, (or data may be calculated remotely from the reference receiver) known as differential data or correction data, to nearby receivers known as rovers to compensate for errors that are common to receivers in close proximity to each other. This technique is known as differential GPS (DGPS), and it can be used to produce extremely accurate positional data for surveying, structural monitoring, etc. Service bureaus and agencies have been established to sell or otherwise provide differential data. Such data range from real-time local information to sometimes very complex mathematical models based on long-term observations. U.S. Government agencies issue orbit correction information on a satellite-by-satellite basis.

Dual frequency carrier GPS receivers continuously track P-code L1 and L2 carriers of a GPS satellite to generate accumulated delta-range measurements (ADR) and at the same time track L1 C/A-code to generate code-phase measurements. Each carrier is modulated with codes that leave the GPS satellite at the same clock time. Since the ionosphere produces different delays for radio carriers that have different radio frequencies, dual carrier receivers can be used to obtain real-time measurements of ionospheric delays at a user's particular position. (L1 is typically 1575.42 MHz and L2 is typically 1227.6 MHz.). The L1 and L2 ADR measurements are combined to generate a new L1 ADR measurement that has an ionospheric delay of the same sign as the ionospheric delay in the L1 pseudorange.

Accurate ionospheric delay figures, if used in a position solution, can help produce much better position solutions. Without such real-time ionospheric delay measurements, mathematical models or measurements taken by third parties (which can be old) must be used instead. The communication of this information to a rover (also known as a mobile or remote unit) can be costly and require wide communications channel bandwidths.

Since selective availability was turned off in May 2000, commercial (i.e. non-military) users are now able to use differential GPS (DGPS) to make position determinations that are accurate to less than a centimeter. With DGPS, a stationary reference station is placed at a very accurately known location. The reference station generates corrections that are sent to rovers that are relatively close to the remote positioning receiver. A DGPS user receives these corrections and applies them to direct GPS measurements that it makes. This gives a user a position solution of very high accuracy.

However, as a remote positioning receiver is moved away from a reference station, the position solution accuracy will be reduced. For the accuracy required for survey applications, carrier-phase tracking receivers are generally required. The L1 and/or L2 carrier signals are used for carrier-phase tracking. Carrier-phase tracking involves measuring differences in carrier phase cycles and fractions of cycles. In DGPS systems, both a reference station and a rover must track the carrier signals at the same time. Atmospheric delay differences at the remote positioning receiver and the rover must be small enough to ensure that both receivers track the same carrier phase. Thus, for carrier-phase surveying (i.e., DGPS with sub-centimeter accuracy), the rover should be within approximately 30 Km of the reference station.

DGPS systems offer greatly improved accuracy over standard GPS systems, but there are some problems in implementing DGPS. For example, in some areas of Europe, UHF/VHF radio transmissions may be limited to 0.5 watts, which severely limits the range at which a rover can receive corrections. Further, direct broadcast of correction data limits a user's ability to post-process data to verify that the remote positioning receiver was operating correctly when critical measurements were made.

SUMMARY OF THE INVENTION

A position determining system using a first communication network, a second communication network, and a positioning system is disclosed. The first communication network may be a packet-switched network, such as a frame relay network or an ATM network. The second communication network may include a public switched telephone network, a CDMA or other wireless network, or any communications network suitable for transmitting GPS data.

The system may also include at least one reference station that has accurately known position coordinates. The reference station can receive position signals from the positioning system, which may be a satellite-based system, such as the NAVSTAR GPS positioning system. Alternatively, the reference station can receive position signals from an earth-based positioning system or another satellite-based system, such as the GLONASS positioning system.

The reference station may be adapted to transmit position data via the first communication network in response to the reference position signals and the known position coordinates. The position coordinates of the reference station can be determined by any known survey technique, or, alternatively, the remote positioning receiver's position may be calculated by using averaging techniques. In averaging, position signals received from the positioning system over a statistically significant period can be used to determine the reference station's position.

A remote central host may be communicatively coupled to the reference station via the first communication network. The remote central host can receive and store the position data (e.g., raw GPS data and real-time kinematic data) transmitted from the reference station and further, the remote central host can generate and transmit correction data in response to the first position signals and the known position coordinates of the remote positioning receiver. The correction data may be sent via the first or second communication network to provide either real-time or archived position corrections to a rover.

The rover is a GPS receiver that is capable of receiving position signals from the positioning system. The rover may also be communicatively coupled to the first or second communication network so that it can receive and use the correction data and the second position signals (i.e., position signals not received at the remote positioning receiver) to accurately determine the rover's position. The data sent by the remote central host could be either real-time or archived. The network may provide any-to-any connectivity for a rover—that is, the rover may receive correction data from virtually any communication network, wireless or land-based, circuit-switched or packet-switched, so that the cost and speed requirements of the user may be accommodated. For example, if the rover must have real-time data regardless of cost and the rover is mobile, the rover may communicate with the remote central host via a wireless communication network, such as a CDMA or other cellular network. If, on the other hand, the rover is in a static position, such as a structural monitoring site, it may be connected to the remote central host directly via landline modem, or it may even access correction data from the remote central host via the Internet.

Differential global positioning systems (DGPS) can greatly enhance the position solution of a mobile receiver known as a rover that is close to a reference station that has an accurately known position. To accomplish this enhancement, it is necessary to transmit position correction data, also known as differential data, from the reference station to the rover. Using the disclosed architecture allows for correction data to be sent to a remote central host in real-time, and retrieval of the correction data may mitigate many of the limitations of direct transmission of correction data. The correction data can be retrieved from the central host by a variety of communications media, such as (without limitation) a mobile telephone network, a circuit-switched network, a packet-switched network, or radio broadcast for use by a rover.

These and other features and advantages of the invention will be more completely described below in the detailed description of the exemplary and alternative embodiments of the invention.

BRIEF DESCRIPTION OF THE DRAWINGS

A presently preferred embodiment of the invention is described below with reference to the drawings, in which like reference numerals refer to like elements in the various views, and in which.

DETAILED DESCRIPTION OF EXEMPLARY AND ALTERNATIVE EMBODIMENTS OF THE INVENTION

Figure 1:
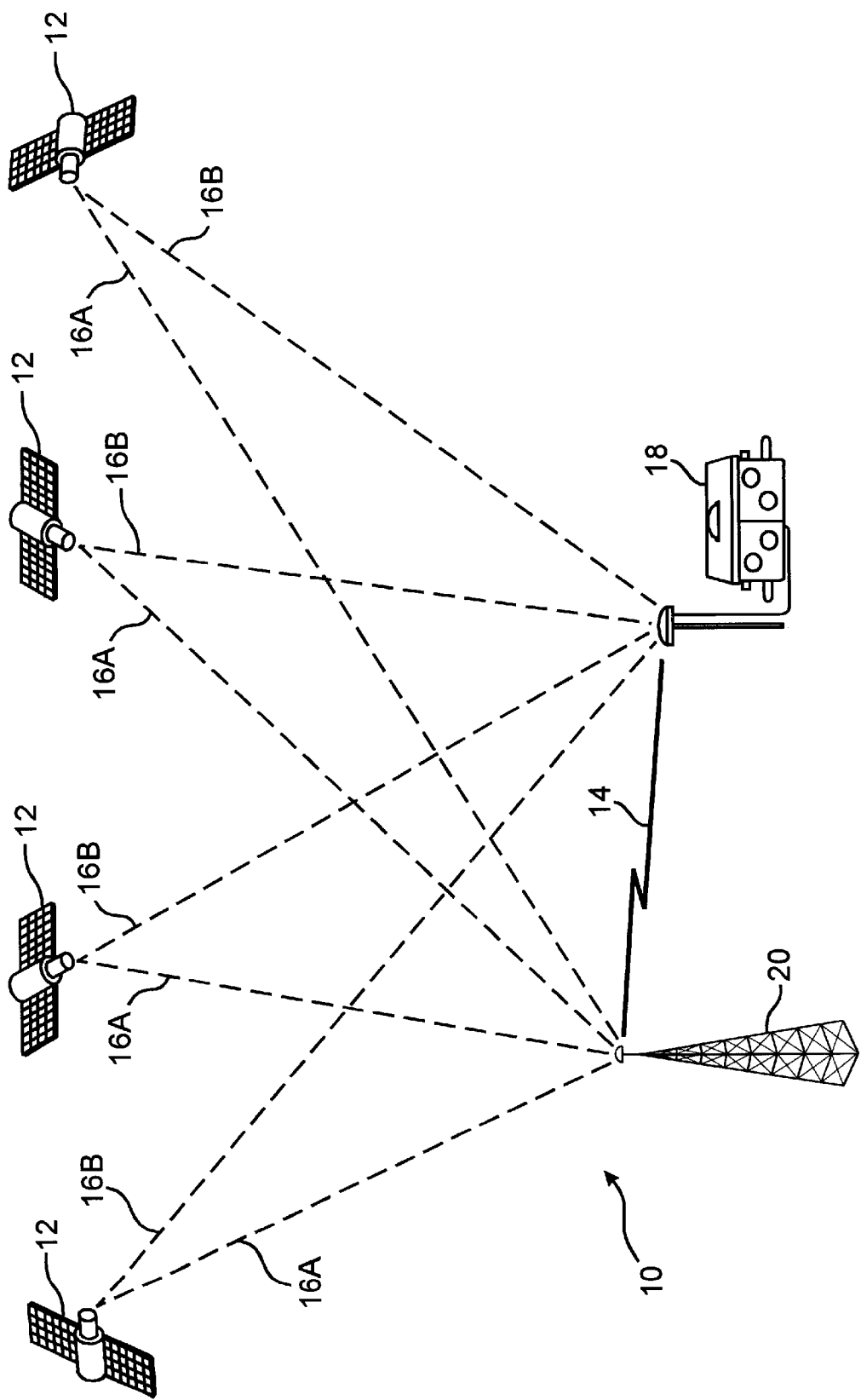
FIG. 1 is a simplified block diagram that illustrates a positioning system in which an exemplary embodiment of the present invention can be implemented.

FIG. 1 illustrates generally the space segment (i.e., satellites 12) of a positioning system and the user segment (i.e., ground-based components) of a positioning system which, combined, comprise a differential positioning system (DGPS) 10 in which an exemplary embodiment of the present invention may be used. The space segment of DGPS 10 (generically referred to as a positioning system) may be a satellite-based radio navigation system, such as the NAVSTAR positioning system (GPS). The positioning system may also be any land-based or satellite-based system, such as LORAN-C, GLONASS, or any other appropriate positioning system. For example, DGPS 10 may comprise a plurality of space-based satellites 12 that send highly accurate position signals 16A and 16B to terrestrial GPS receivers, such as reference station 20 and a rover, such as rover 18, respectively. Reference station 20 has an accurately known position; because reference station 20 has an accurately known position, it can transmit position correction data to rover 18 via data path 14, to be described in greater detail with reference to FIG. 2, below. Rover 18 and reference station 20 can both be either an RS500 or RS530 GPS receiver from Leica Geosystems, or any other suitable GPS receiver.

Figure 2:
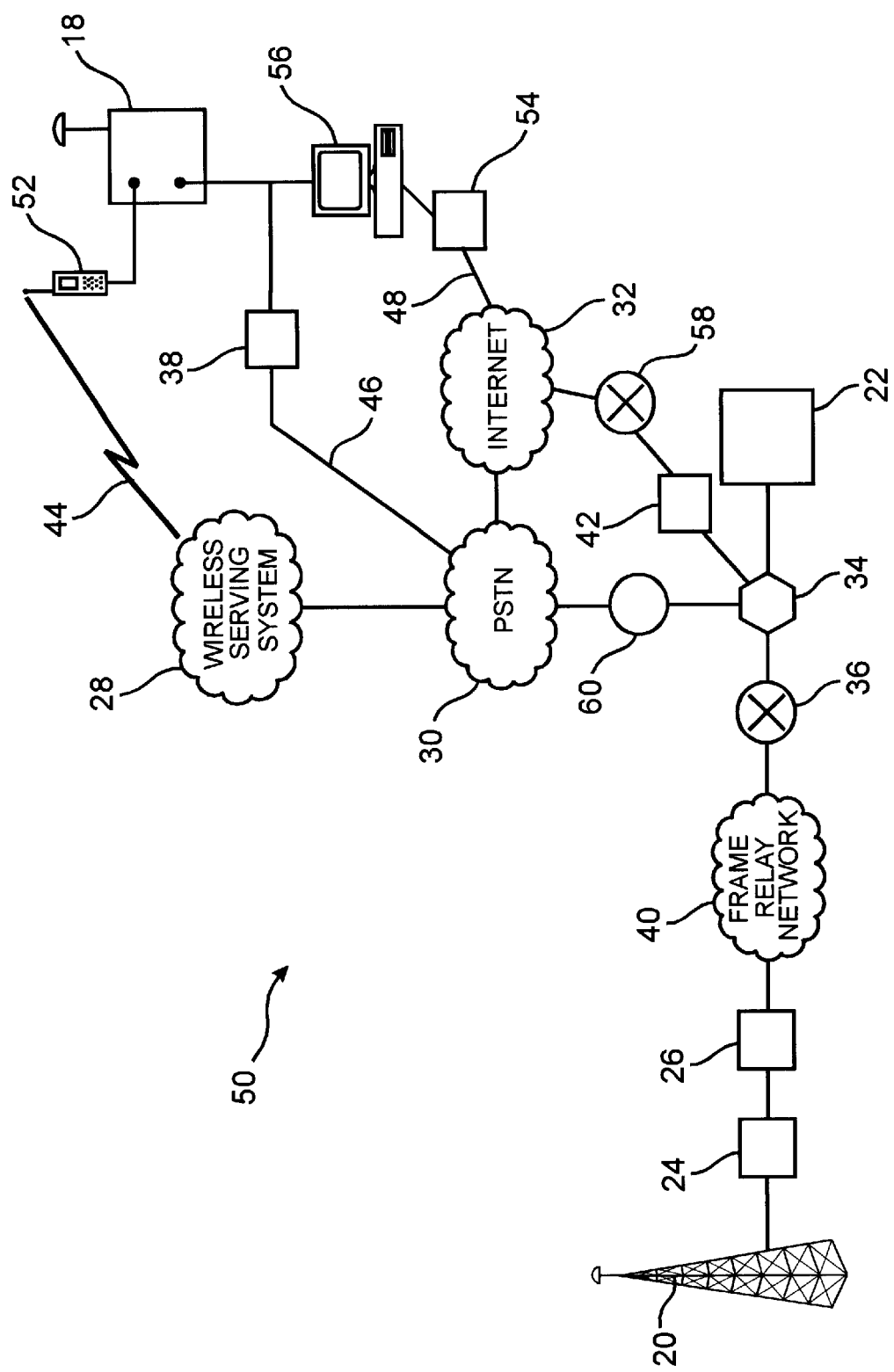
FIG. 2 is a simplified block diagram that illustrates an exemplary embodiment of the communications architecture of the present invention.

FIG. 2 illustrates the user segment of DGPS 10 in which an exemplary embodiment of the present invention may be implemented. The user segment includes a first communications network, such as frame relay network 40, and a second communications network 50, which may include a circuit-switched network such as PSTN 30, a wireless serving system such as wireless serving system 28, the Internet 32, or any other suitable communications network. It should be noted that it is not critical to the present invention that the first communication network be a frame relay network; with reasonable latency performance, any network capable of carrying data from reference station 20 to remote central host 22 will permit the invention to work correctly.

The space segment of DGPS 10, consisting of satellites 12, may provide position information to a remote positioning receiver such as rover 18 via a second set of position signals 16B. The accuracy of information available at rover 18 may be greatly enhanced by correction data from reference station 20. The correction data from reference station 20 may be generated at reference station 20 or at remote central host 22 in response to a first set of position signals 16A received at the reference station. Reference station 20 may be a Leica Geosystems 500 GPS receiver, antenna, and associated hardware. Reference station 20 may alternatively be any suitable GPS receiver and associated hardware. The correction data from reference station 20 can be transmitted to rover 18 via data path 14 (shown in FIG. 1) which may include the various communication components shown in FIG. 2. This configuration is not essential to the operation of the present invention, however. For example, one or more of the components shown in FIG. 2 may be eliminated or integrated with other components of the system without affecting the proper functioning of the system.

Reference station 20 may transmit GPS data to a remote central host such as remote central host 22 for processing and/or forwarding to rover 18. The position or correction data may first be sent to remote central host 22 from reference station 20 via frame relay network 40. After it is stored and/or further processed, the data may be sent to one or more rovers via second communications network 50.

The exemplary embodiment of the user segment of DGPS 10 shown in FIG. 2 integrates frame relay network 40, second communications network 50, and remote central host 22 to accurately solve for the location of rover 18. DGPS 10 communicatively couples reference station 20 with rover 18 via communications networks 40 and 50 to provide real-time or archived correction data to rover 18. The correction data is first transmitted from reference station 20 to remote central host 22, which may then forward the data to rover 18. Although only one reference station and one rover are shown, those skilled in the art will appreciate that any number of reference stations or rovers may be used without departing from the scope or spirit of the present invention.

In an exemplary embodiment, reference station 20 communicates RS-232 data to terminal server 24, which converts the data to TCP/IP over Ethernet protocol. Terminal server 24 may be a MAXserver MX-1604 from NBase-Xyplex, or any other suitable terminal server. The TCP/IP data is then sent to frame relay access device (FRAD) 26, which formats the data for transmission over frame relay network 40. In the exemplary embodiment, FRAD 26 is an Adtran 5210 router. At the remote side of frame relay network 40, the GPS data is received by a router 36, such as a Cisco 1700 router, and then sent to remote central host 22 via a hub 34. Remote central host 22 may store and/or process and forward correction data to second communication PSTN 30 of network 50 via hub 34. Remote central host 22 may be any suitable server capable of running IRONet GPS network software from Leica Geosystems, such as a high-speed server running the Windows NT operating system.

Remote central host 22 may also forward GPS correction data to an Internet server 42 via hub 34. Internet server 42 can then forward the correction data to Internet 32 of second communications network 50 via router 58. Access to correction data via Internet server 42 can be limited with an appropriate device, such as a firewall (not shown) if desired.

Rover 18 may receive the correction data, either in real-time or after measurements are taken (i.e., archived or post-processed data) via second communication network 50. To accomplish this, rover 18 may be connected to a communications device, preferably a CDMA wireless telephone 52 such as a Motorola Timeport P1867 cellular phone acting as a cellular modem. Wireless telephone 52 can receive data from second communications network 50 via wireless serving system 28 and air interface 44. Air interface 44 may be a conventional air interface, such as a $U_m$ interface as defined by IS-95. Alternatively, the functionality of wireless telephone 52 could be integrated into rover 18.

In addition to the wireless telephone architecture described above, the architecture embodied by the invention allows other communications devices and interfaces to provide rover 18 with correction data from reference station 20, and this increases the flexibility of the system. For example, a modem 38 may be connected to rover 18 and to PSTN 30 via data path 46. Modem 38 may thus receive data from a direct terrestrial connection to remote central host 22 via PSTN 30, its associated remote access server 60, and hub 34. Alternatively, rover 18 may receive data from Internet 32 via data path 48. To use such a connection, rover 18 may be connected to a PC 56, such as an IBM-compatible PC running the Windows operating system. PC 56, in turn, may be connected to modem 54 or, alternatively, PC 56 may be connected to the Internet via an internal modem (not shown).

The NAVSTAR GPS which may be used in conjunction with the invention consists of 24 satellites in 6 orbital planes at a height of about 20,000 Km. The satellites are positioned so that a minimum of 5 satellites are "visible" at all times. With position signals from three satellites, a GPS receiver can make an accurate calculation of its position in three dimensions. To calculate a position solution, the GPS receiver measures the propagation times of position signals from the satellites to a very high accuracy. If signals from only three satellites are used, the GPS receiver must have a very accurate clock, such as an atomic clock, to accomplish this. However, by measuring the apparent signal propagation times from four satellites, rather than three, the GPS receiver can determine its position in three dimensions (latitude, longitude, and altitude) and also solve for clock bias, so that a less accurate clock may be used in the GPS receiver. A GPS position solution can be calculated if the positions of the satellites in view are known and the distance from the receiver to the satellites, as calculated by the propagation delays of the signals (i.e., the pseudoranges) are known.

Differential positioning system 10 may be referred to as a local area DGPS system, or LADGPS. An LADGPS can provide a very accurate position solution because the pseudorange error components are common to receivers in close proximity to each other. If rover 18, for example, is very close to reference station 20, both receivers may view the same satellites 12 (i.e., position signal 16A and 16B arrive from the same satellites and experience substantially similar delays) and also, loss of accuracy due to spatial decorrelation may not be significant. Further, if phase information of the position signals 16 is used in addition to code information (i.e., "carrier phase tracking") and rover 18 is used to make static position measurements, sub-centimeter accuracy may be realized from DGPS 10.

Traditionally, DGPS has been implemented by transmitting data to rovers via VHF/UHF datalinks (e.g., aircraft systems or Terrestrial communications systems) or MF datalinks (e.g., maritime systems). As shown in FIG. 2, DGPS 10 may be implemented without the limitations of previous systems. For example, DGPS 10 does not require that reference station 20 be positioned at or coupled directly to a mobile transceiver. Nor does it require that rover 18 be coupled to any of the components of the system by a cellular communications datalink, although rover 18 is illustrated as a cellular-coupled GPS receiver in one embodiment. For example, rover 18 can also be coupled to reference station 20 via a landline modem, such as modem 38 or modem 56, and thus could receive correction data via PSTN 30, Internet 32, or any other type of network capable of handling the data rate required by rover 18.

In order to serve as a reference station, it is necessary that the position of reference station 20 be accurately known. In addition to the techniques described above for accomplishing this, reference station 20's position may be confirmed, calculated, or monitored by other nearby remote positioning receivers connected to DGPS 10.

Reference station 20 may be a dual frequency receiver that provides two data stream outputs via two RS-232 serial data ports. One data port provides raw GPS data, while the other provides real-time kinematic (RTK) data. Both ports may transmit data at anywhere from 2400 BPS to 115.2 KBPS. In the exemplary embodiment, both ports are configured to transmit and receive data at 9600 BPS. The RS-232 data from reference station 20 may be output to a stand-alone terminal server, such as terminal server 24. Terminal server 24 converts the RS-232 data from reference station 20 to TCP/IP over Ethernet format. The TCP/IP output of terminal server 24 may be sent to frame-relay access device (FRAD) 26 via a category 5 crossover cable. FRAD 26 in turn may route the GPS data via frame relay network 40 to router 36. It is not crucial to the functioning of the present invention that the data transmitted by reference station 20 is sent over a frame relay network. For example, the data may be sent over a terrestrial private line or ATM network or any data network capable of handling data at rates above 2400 BPS. The GPS data may also be sent over a satellite communication network or a public internet, but the latter 2 types of networks may impose variable delay that could prove unacceptable for real-time position solutions at rovers such as rover 18. The latencies typically associated with terrestrial private line, ATM, or frame relay networks, though, can be tolerated by real-time applications of DGPS 10.

In the exemplary embodiment, reference station 20 (and all remote positioning receivers in DGPS 10) may have a single LAN class-of-service permanent virtual circuit (PVC) mapped from FRAD 26 to the host port on remote computer host 22. Since all frames in a PVC follow a predetermined path from one site to another, it is unlikely that the frames will arrive out of sequence.

The space segment of DGPS 10 may include components of a navigation system using NAVSTAR GPS or GLONASS, which can provide position data to rover 18 and reference station 20. Alternatively, position data may be sent to reference station 20 and rover 18 from a land-based (i.e., a psuedolite) positioning system. Satellites 12 of NAVSTAR GPS maintain accurate and synchronized time and simultaneously transmit position signals that contain satellite specific and system information required by rover 18 and reference station 20 to generate position solutions. The position signals may include high-precision clock and ephemeris (called "almanac") data for a particular satellite, low-precision clock and ephemeris data for every satellite in the constellation, health and configuration status for all satellites, user text messages, and parameters describing the offset between GPS system time and UTC.

Rover 18 and reference station 20 typically receive position signals from four or more satellites of the NAVSTAR GPS. Additional satellites (not shown) may also transmit position signals to rover 18. As described above, if rover 18 and reference station 20 receive position signals from at least four satellites, they can solve for position information independent of inherent clock bias ($C_B$) between the space segment of DGPS 10, rover 18, and reference station 20.

Using information transmitted from 3 satellites of positioning system 12 and, optionally, additional position signals, rover 18 may determine its position using satellite position signals and pseudorange data represented by the time of arrival of message data streams from satellites 12 to rover 18.

Satellites 12 also transmit position signals to reference station 20. As previously discussed, the reference station's earth-centered, earth-fixed (ECEF) position is accurately known. Reference station 20 may make both code-based and carrier-phase pseudorange measurements of its position based on the position signals it receives from satellites 12, just as rover 18 can, but, because its position is already accurately known, reference station 20 can calculate any errors in the pseudorange measurements (e.g., errors due to atmospheric delays, etc.) that it makes.

In addition, reference station 20 can transmit differential correction data based on the errors it measures in its pseudorange measurements (i.e., pseudorange corrections) to rover 18 or any rover generally within 30 Km of reference station 20 to greatly improve the position solution of rover 18. Of course, correction data may also be transmitted to rovers at distances greater than 30 Km, but the accuracy of the corrections will be degraded due to the increased distance. In the exemplary embodiment, reference station 20 may first send correction data to remote central host 22 via frame relay network 40.

The GPS data (both raw and correction) sent over frame relay network 14 is typically in the form of relatively small 300–400 byte packets. Due to the design of the NAVSTAR GPS, data from reference station 20 and any other remote positioning receivers of DGPS 10 will be sent to remote central host 22 in synchronized 1-second bursts. This is a typical "bursty" application, which is not a problem for transport over a frame relay network such as first communication network 14.

Remote central host 22 may store and process the correction data. Remote central host 22 may be any suitable server, such as a Microsoft Windows NT server that is capable of running an appropriate GPS network software package, such as Leica's IRONet package.

Once the GPS data is received at remote central host 22, the correction data can be forwarded in real-time (or, alternatively, archived or averaged data may be forwarded) to rover 18 via second communications network 50. Further, GPS data from reference station 20 and all other remote positioning receivers of DGPS 10 can be archived for post-processing. Second communications network 50 may include a wireless serving system 28 interconnected to public-switched telephone network (PSTN) 30, or second communication network 50 may be comprised solely of wireless serving system 28. Second communications network 50 may further include an Internet 32. Rover 18 may thus receive correction data from any modem device, such as a wireless CDMA phone acting as a cellular modem, a landline-based analog modem, a frame-relay access device, a radio modem, or any other device suitable for receiving GPS correction data.

Remote central host 22 may either continuously broadcast correction data over second communication network 50 or remote central host 22 may send correction data to rover 18 when requested by a user via the user interface of rover 18. Remote central host 22 may perform the additional function of monitoring the integrity of data from any remote positioning receiver in the network. For example, if reference station 20 were to send GPS data that is beyond a preset tolerance from the known position of reference station 20, remote central host 22 may block the transmission of correction data from reference station 20. Rovers that would ordinarily use correction data from reference station 20 could then use correction data from the nearest remote positioning receiver in the network or the rovers could record uncorrected GPS data and correction data stored by remote central host 22 could be used later for post-processing correction of the data points taken. Since the network allows for virtually any number of remote positioning receivers to be connected to remote central host 22, remote central host 22 may process and store averaged correction data from any or all remote positioning receivers in DGPS 10. While providing less accuracy than if reference station 20 were used, using averaged correction data can still provide rover 18 with correction data so that its measurements will be more accurate than they would be without any correction data.

As illustrated in FIG. 1, reference station 20 can be located virtually anywhere. For example, it is not necessary that reference station 20 be co-located at a radio transceiver or cellular transceiver. As long as reference station 20 can communicate with remote central host 22, reference station 20 can be used to provide correction data to rovers. Further, rover 18 may communicate with remote central host 22 via direct landline modem, cellular modem, or via the Internet, depending on the cost of the connection and the needs of a user. For example, rover 18 may be a stationary site set up to permanently monitor the structural integrity of a bridge or a dam, or to monitor the movement of tectonic plates (i.e., Geodesy), etc. For such applications, connecting rover 18 to remote central host 22 via cellular data link would probably not be the most cost effective means of communication. Further, real-time processing in such an application may not be necessary; thus, the data transmission requirements of second communication network 50 could be satisfied by an Internet connection. While an Internet connection may not always satisfy a DGPS system's real-time requirements, an Internet connection could satisfy real-time requirements, depending on network performance parameters. Of course, when using the Internet to transmit correction data, appropriate data network security measures may be advisable.

Figure 3:
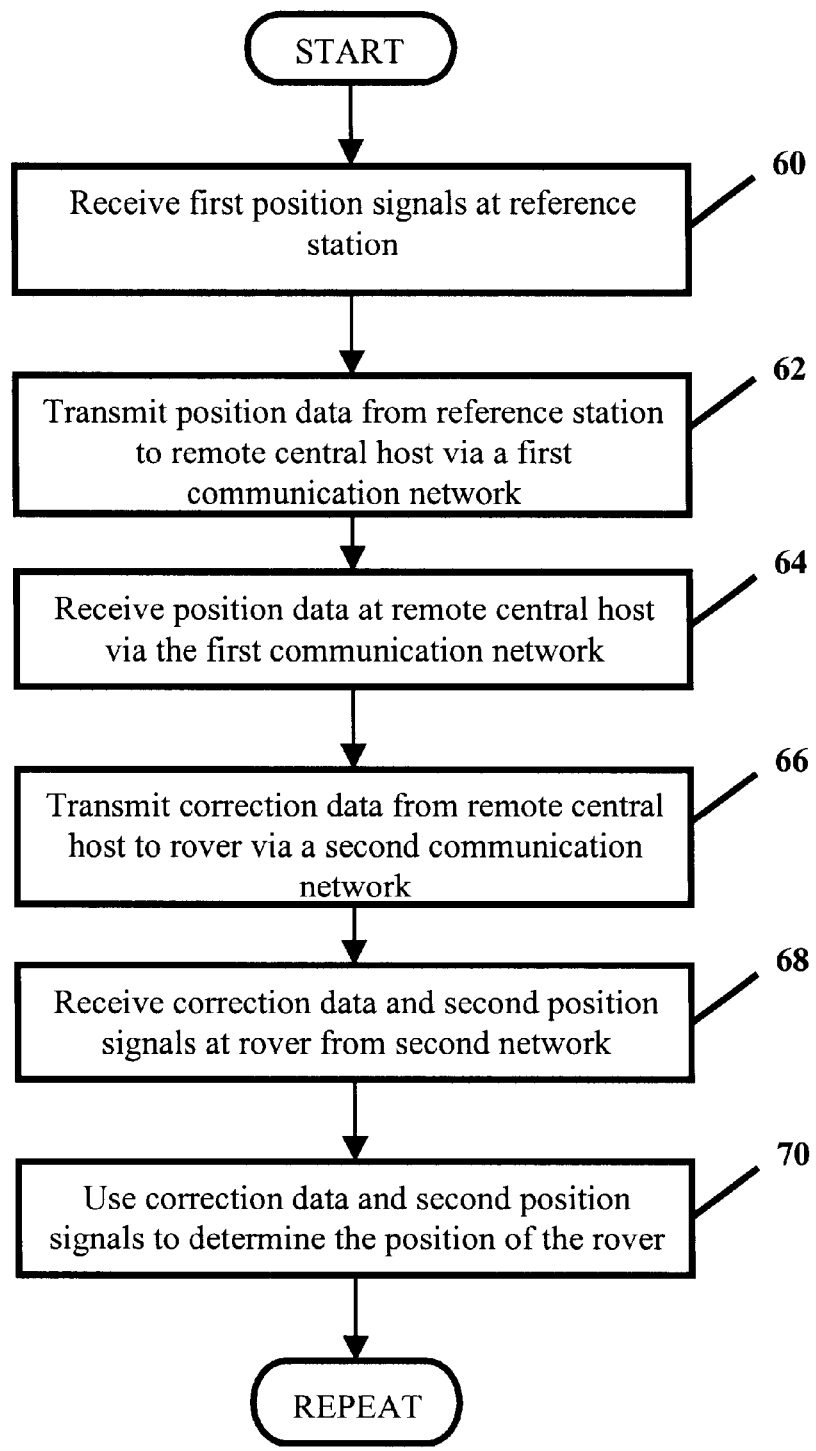
FIG. 3 is a flow chart that illustrates the operation of an exemplary embodiment of the present invention.

FIG. 3 illustrates a set of functions that may be involved in an exemplary embodiment of the present invention where rover 18 can receive correction data from reference station 20 via at least two communication networks. The position of exemplary rover 18 may then be very accurately determined using conventional DGPS techniques to apply the correction data to position solutions calculated by rover 18 using position signals 16B.

First, in step 60, a first set of position signals 16A, as described above, is received at reference station 20 from satellites 12 of DGPS 10. The position signals 16B travel through the atmosphere to reach reference station 20. As is well known, the atmosphere and other factors, such as clock differences, create errors in any position solution calculated by reference station 20 using position signals 16A. Since the position of reference station 20 is accurately known, however, the error can be accounted for and removed by mathematical procedures performed either at reference station 20 or remote host 22. To accomplish this, position data is transmitted from reference station 20 to remote central host 22 via a first communication network, such as frame relay network 40, as shown at step 62.

As shown at step 64, remote central host 22 receives position data, either processed or unprocessed, from reference station 20 via the first communication network. Next, correction data is transmitted from remote central host 22 to rover 18 via second communication network 50 (step 66). Rover 18 receives the correction data via second communication network 50, and also receives a second set of position signals 16B from satellites 12, as illustrated by step 68. Finally, as shown at step 70, rover 18 may use conventional DGPS techniques to accurately solve for its position using both the correction data from reference station 20 and position signals 16B.

This procedure may be repeated continuously until all desired measurements have been made, so that the position of rover 18 may be determined "on the fly." It should be noted that, although FIG. 3 illustrates "steps" in a sequential order, the steps could be implemented in a different order or combined with other steps without violating the spirit or scope of the present invention.

Although the present invention has been described with several embodiments, various changes and modifications may be suggested to one skilled in the art, and it is intended that the present invention encompass such changes and modifications as fall within the scope of the appended claims.

I claim:

1. A differential GPS system (DGPS) using a first communication network, a second communication network, and a positioning system, the DGPS system comprising:

at least one real reference station, the at least one real reference station having known position coordinates and being operable to receive first position signals from the positioning system, the at least one real reference station being further operable to transmit position data via the first communication network in response to the first position signals and the known position coordinates; and a remote central host communicatively coupled in parallel to at least the first communication network and the second communication network, the remote central host being operable to receive and store the position data transmitted from the at least one real reference station and being further operable to transmit, via the second communication network, correction data in response to the first position signals and the known position coordinates of the at least one real reference receiver wherein the correction data is correction data for the at least one real reference station;

wherein a rover that is bidirectionally, communicatively coupled to at least the second communication network and operable to receive second position signals from the positioning system uses the correction data and the second position signals to determine the rover's position.

2. The system of claim 1, wherein the second communication network comprises a parallel connection of at least two networks selected from the group consisting of a cellular communications network, a circuit-switched network, and a packet-switched network.

3. The system of claim 1, wherein the first position signals comprise time-of-arrival data received by the remote positioning receiver from a plurality of satellites; and the correction data comprises pseudorange corrections for each satellite in view of the remote positioning receiver.

4. The system of claim 1, wherein the first communication network comprises a frame relay network.

5. The system of claim 4, wherein the second communication network comprises a circuit-switched network.

6. The system of claim 1, wherein the second communication network comprises a cellular telephone network.

7. The system of claim 1, wherein the second communication network comprises a packet-switched network.

8. The system of claim 1, wherein the correction data is real-time kinematic data.

9. The system of claim 8, wherein the second communication network comprises a packet-switched network.

10. The system of claim 9, wherein the packet-switched network is the Internet.

11. The system of claim 1, wherein the correction data comprises archived data.

12. The system of claim 1 wherein the rover comprises a carrier-phase tracking GPS receiver.

13. The system of claim 1 wherein the rover comprises a carrier-phase tracking GPS receiver and the at least one real reference station comprises a carrier-phase tracking GPS receiver.

14. A method of determining a position of at least one rover within a positioning system, the method comprising:

receiving first position signals from the positioning system at at least one real reference station having known position coordinates and being operable to transmit correction data via a packet-switched network in response to the first position signals and the known position coordinates;

receiving the correction data from the at least one real reference station at a remote central host via the packet-switched network, the remote central host being operable to responsively store and transmit the correction data via a second communication network, the remote central host also being communicatively coupled in parallel to at least the packet-switched network and the second communication network;

wherein the correction data is correction data for the at least one real reference station;

establishing a bidirectional connection between the at least one rover and the remote central host via the second communication network;

transmitting the correction data from the remote central host to the at least one rover via the second communication network;

receiving the correction data at the at least one rover;

receiving second position signals at the at least one rover; and using the correction data and the second position signals to determine the position of the rover.

15. The method of claim 14, wherein the first position signals comprise time-of-arrival data received by the remote positioning receiver from a plurality of satellites; and the correction data comprises pseudorange corrections for each satellite in view of the remote positioning receiver.

16. The method of claim 15, wherein the rover comprises a carrier-phase tracking GPS receiver.

17. The method of claim 15, wherein the rover comprises a carrier-phase tracking GPS receiver and the reference station comprises a carrier-phase tracking GPS receiver.

18. The method of claim 14, wherein the packet-switched network comprises a frame relay network.

19. The method of claim 14, wherein the second communication network comprises a circuit-switched network.

20. The method of claim 14, wherein the second communication network comprises a cellular telephone network.

21. The method of claim 14, wherein the second communication network comprises a packet-switched network.

22. The method of claim 14, wherein the correction data comprises real-time kinematic data.

23. The method of claim 22, wherein the second communication network comprises a packet-switched network.

24. The method of claim 23, wherein the packet-switched network is the Internet.

25. The method of claim 14, wherein the correction data comprises archived data.

26. The method of claim 14, wherein the second communication network comprises a parallel connection of at least two networks selected from the group consisting of a cellular communications network, a circuit-switched network, and a packet-switched network.

27. A method of determining a position of at least one rover within a positioning system, the method comprising:

establishing the position coordinates of at least one real reference station by mathematically averaging position signals received at the at least one real reference station over a period of time, the at least one real reference station being operable to transmit correction data via a packet-switched network;

receiving correction data from the at least one real reference station at a remote central host via the packet-switched network, the remote central host being operable to store and transmit correction data for the at least one real reference station in response to the position data and the established position coordinates of the at least one real reference station, the remote central host also being communicatively coupled in parallel to at least the packet-switched network and a second communication network;

establishing a bidirectional connection between the at least one rover and the remote central host via the second communication network;

transmitting the correction data from the remote central host to the at least one rover via the second communication network;

receiving the correction data at the at least one rover;

receiving second position signals at the at least one rover; and using the correction data and the second position signals to determine the position of the at least one rover.

28. A differential GPS system (DGPS) using a frame relay network, a circuit switched network, and a positioning system, the DGPS system comprising:

at least one carrier-phase tracking GPS reference station, the at least one carrier-phase tracking GPS reference station having known position coordinates and being operable to receive first position signals from the positioning system, the at least one carrier-phase tracking GPS reference station being further operable to transmit position data via the frame relay network in response to the first position signals and the known position coordinates; and a remote central host communicatively coupled in parallel to at least the frame relay network and the circuit switched network, the remote central host being operable to receive and store the position data from the at least one carrier-phase tracking GPS reference station and being further operable to transmit, via the circuit switched network, correction data in response to the first position signals and the known position coordinates of the at least one carrier-phase tracking GPS reference receiver wherein the correction data is correction data for the at least one carrier-phase tracking GPS reference station; and wherein a carrier-phase tracking GPS receiver that is bidirectionally, communicatively coupled to at least the circuit switched network and operable to receive second position signals from the positioning system uses the correction data and the second position signals to determine the carrier-phase tracking GPS receiver's position.

* * * * *